Feb. 19, 1935. W. N. BOOTH 1,991,489
WHEEL
Filed Aug. 10, 1931 2 Sheets-Sheet 2
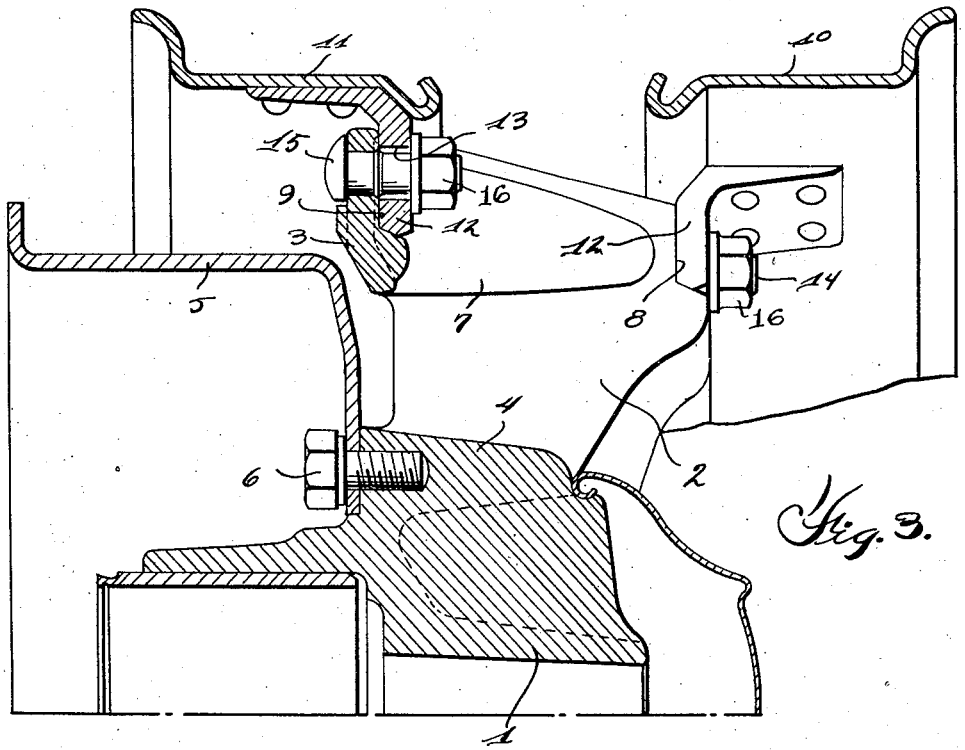
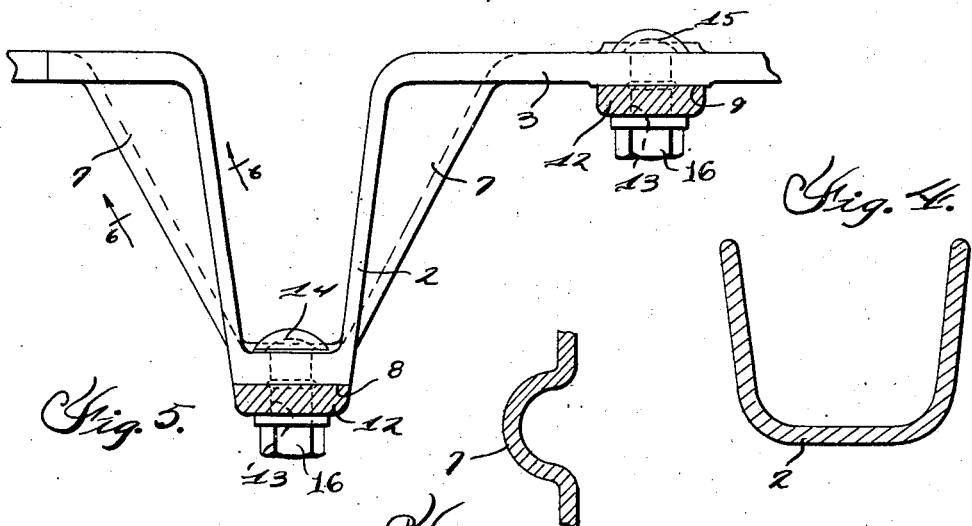
INVENTOR
William N. Booth
BY
Whittemore Hulbert
Whittemore Belknap
ATTORNEYS Patented Feb. 19, 1935

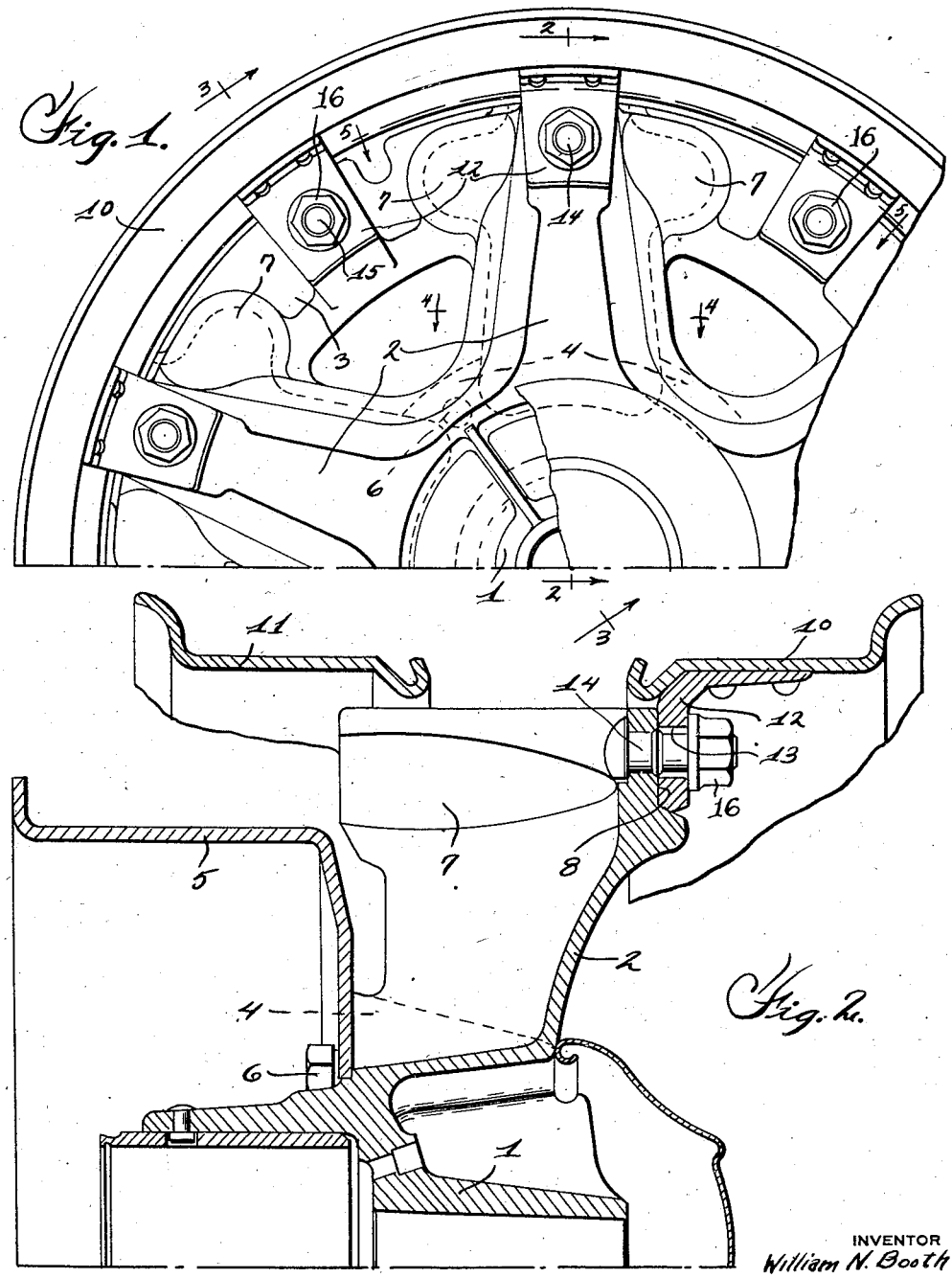

1,991,489

UNITED STATES PATENT OFFICE 1,991,489

WHEEL

William N. Booth, Detroit, Mich., assignor to Kelsey-Hayes Wheel Corporation, Detroit, Mich., a corporation of New York Application August 10, 1931, Serial No. 556,257

3 Claims. (Cl. 301—65)

The invention relates to wheels and refers more particularly to wheels for motor vehicles and of that type having dual tire carrying rims. One of the objects of the invention is to provide an improved construction of dual rim type wheel which may be economically made and which is strong and substantial and relatively light. Another object is to provide a spoked wheel, the spokes of which are reinforced by webs extending therebetween, both the spokes and webs having axially separated seats upon which may be mounted the pair of tire carrying rims.

These and other objects of the invention will become apparent from the following description, taken in connection with the accompanying drawings, in which Figure 1 is a front elevation of a portion of a wheel, showing an embodiment of my invention;

Figures 2, 3, 4 and 5 are cross sections, respectively, on the lines 2—2, 3—3, 4—4 and 5—5 of Figure 1;

Figure 6 is a cross section on the line 6—6 of Figure 5.

The wheel shown in the present instance as embodying my invention has the wheel hub 1, the series of spokes 2 radiating from the hub and the series of circumferentially extending webs 3 connecting the spokes. The spokes and the webs form the wheel body and the spokes. The webs and the hub are integral with each other and are preferably formed of cast malleable iron. The hub 1 is provided with the radially outwardly extending bosses 4 located between the spokes 2 against the rear faces of which the brake drum 5 is secured by suitable means, such as the cap bolts 6; extending axially and threaded into the bosses.

The spokes 2 are channel-shaped and open rearwardly and the webs 3 connect the rear edges of the side walls of these spokes at their outer ends. Hollow reinforcing ribs 7 are preferably provided between the webs and the hollow spokes, these ribs extending transversely or axially of the spokes and merging into the webs at points spaced from the side walls of the spokes and into the spokes at the front edges of their side walls.

The front sides of the hollow spokes 2 at their outer ends are provided with the rim engaging seats 8, all of these seats being in the same plane of rotation. The front sides of the webs 3 at their centers are provided with the rim engaging seats 9, all of these seats being in the same plane of rotation. The seats 8 and 9 are axially separated, the former being in front of the median plane of the spokes and the latter being in rear of this plane. The seats 8 and 9 alternate or are in staggered relation.

10 and 11 are respectively the front and rear tire carrying rims, both being alike and having the radially inwardly extending lugs 12 fixedly secured to their base portions. These lugs are apertured at 13 to receive the bolts 14 and 15 fixedly secured to and extending transversely of the spokes and webs respectively. 16 are securing nuts adapted to be threaded upon the bolts 14 and 15 to detachably secure the rims to the seats. It will be noted that the front rim 10 is mounted upon the spokes in reverse relation to the rear rim 11, so that proper axial spacing of the rims is secured to provide the necessary clearance between the tires upon these rims.

With the above construction, it will be seen that the wheel may be made at relatively low cost, that it is strong and substantial and at the same time relatively light. It will also be seen that the front rim may be readily removed and also that after this front rim is removed the rear rim may also be readily removed, inasmuch as the seats of the wheel body for engaging this rear rim alternate with the seats of the wheel body for engaging the front rim.

What I claim as my invention is:

1. In a wheel, a wheel body comprising radiating spokes, webs integrally connecting the rear edges of the spokes, reinforcing ribs extending from the front portions of the spokes axially of the latter and merging into the webs at points spaced from opposite side walls of the spokes, rim engaging seats upon the spokes and webs, and a pair of tire carrying rims mounted on the seats.

2. In a vehicle wheel, a wheel body comprising rearwardly opening channel-shaped spokes and circumferentially extending webs integrally connecting the rear edges of the spokes, portions of the opposite side walls of the spokes and adjacent portions of the webs being disposed outwardly with respect to the spokes to form substantially channel shaped reinforcing ribs, rim engaging seats upon the spokes and webs, and tire carrying rims mounted on said seats.

3. In a wheel, a wheel body comprising rearwardly opening channel-shaped spokes and circumferentially extending webs integrally connecting the rear edges of the spokes, substantially channel shaped reinforcing ribs formed in opposite side walls of the spokes extending from the front portions of the spokes to the webs, rim engaging seats upon said spokes and also upon the webs intermediate the spokes, and tire carrying rims respectively mounted upon said seats.

WILLIAM N. BOOTH.